(12) United States Patent
Esfahany et al.

(10) Patent No.: US 8,365,183 B2
(45) Date of Patent: Jan. 29, 2013

(54) SYSTEM AND METHOD FOR DYNAMIC RESOURCE PROVISIONING FOR JOB PLACEMENT (75) Inventors: Kouros Hodaee Esfahany, Huntington, NY (US); Rich Jan Lau, Deer Park, NY (US); Michael Ralph Chiaramonte, Nesconset, NY (US)

(73) Assignee: CA, Inc., Islandia, NY (US)

( * ) Notice: Subject to any disclaimer, the term of this patent is extended or adjusted under 35 U.S.C. 154(b) by 1068 days.

(21) Appl. No.: 12/203,018

(22) Filed: Sep. 2, 2008

(65) Prior Publication Data

US 2010/0058352 A1 Mar. 4, 2010

(51) Int. Cl.
G06F 9/48 (2006.01)
(52) U.S. Cl. ........................................ 718/104; 718/105
(58) Field of Classification Search .................... None
See application file for complete search history.

(56) References Cited

U.S. PATENT DOCUMENTS

| | | | | |
|---|---|---|---|---|
| 7,340,598 | B2 | 3/2008 | Esfahany | 713/100 |
| 2006/0080666 | A1* | 4/2006 | Benedetti et al. | 718/104 |
| 2007/0016907 | A1* | 1/2007 | Benedetti et al. | 718/104 |
| 2007/0245349 | A1* | 10/2007 | Sinn | 718/100 |
| 2008/0066070 | A1* | 3/2008 | Markov | 718/103 |

OTHER PUBLICATIONS

U.S. Appl. No. 12/103,155; Title: System and Method for Generating a Unified Service Model; Inventors Goodman et al.; Filed Apr. 15, 2008.
U.S. Appl. No. 12/203,045; Title: System and Method for Efficient Machine Selection for Job Provisioning; Inventors Diwakar et al.; Filed Sep. 2, 2008.

* cited by examiner

*Primary Examiner* — Eric Coleman
(74) *Attorney, Agent, or Firm* — Baker Botts L.L.P.

(57) ABSTRACT

A method for dynamic resource provisioning for job placement includes receiving a request to perform a job on an unspecified computer device. One or more job criteria for performing the job are determined. Each job criteria defines a required operational characteristic needed for a computer device to perform the job. A list of available computer devices is provided. The list includes a plurality of computer devices currently provisioned to perform computer operations. A list of suitable computer devices for performing the job is determined from the list of available computer devices by comparing operational characteristics for each available computer device with the job criteria. The list of suitable computer devices includes one or more computer devices having operational characteristics that satisfy the job criteria. From the list of suitable computer devices, a least active computer device is determined, and the job is forwarded to the least active computer device.

20 Claims, 2 Drawing Sheets

SYSTEM AND METHOD FOR DYNAMIC RESOURCE PROVISIONING FOR JOB PLACEMENT

TECHNICAL FIELD

The present disclosure relates generally to computer system management and more particularly to a system and method for dynamic resource provisioning for job placement.

BACKGROUND

Reliability and speed of processing activities has become increasingly important, particularly in large groups of computer systems where multiple users may require system resources to perform various processing activities. These processing activities may compete with one another for system resources. Overloading a server in a computer network with too many processing activities may cause the server to operate poorly or crash. Accordingly, the ability to distribute processing activities intelligently within a computer system, for example a set of servers, may increase overall operational efficiency.

SUMMARY

The present disclosure relates generally to a system and method for dynamic resource provisioning for job placement. In particular embodiments, a method for dynamic resource provisioning for job placement includes receiving a request to perform a job on an unspecified computer device. One or more job criteria for performing the job and one or more utilization criteria for performing the job are determined. The one or more job criteria define one or more operational characteristics needed for a computer device to perform the job. The method further includes providing a list of available computer devices. The list of available computer devices includes a plurality of computer devices currently provisioned to perform computer operations. From the list of available computer devices, a list of suitable computer devices for performing the job is determined by comparing operational characteristics for each available computer device with the job criteria. The list of suitable computer devices includes one or more computer devices having operational characteristics that satisfy the job criteria. The method further includes using the utilization criteria to determine whether one or more underutilized computer devices exist on the list of suitable computer devices wherein the one or more underutilized computer devices have a suitable level of utilization for performing the job. If the one or more underutilized computer devices exist, the job is forwarded to one of the one or more underutilized computer devices.

Technical advantages of particular embodiments of the present disclosure may include providing a system and method for evaluation of real-time, aggregated overall utilization of computer devices, according to user-definable criteria for computer device allocation, and computer device provisioning. Flexible, user-definable criteria (e.g., job criteria) and rules for evaluating the overall utilization of individual computer devices may be applied to user defined resource pools to select the best computer device available for performing a job. Moreover, the evaluation criteria (e.g., job criteria) are varied and therefore may provide sufficient information to make real-time intelligent decisions about the state of user defined resource pools. As an additional technical advantage of the present disclosure, user-defined criteria may be used to determine the type of new computer device to be provisioned for a new job if no suitable computer device is identified within a pool of active computer devices. Moreover, the ability to factor in hardware and software component information (e.g., as job criteria) in addition to a variety of utilization metrics may provide a further technical advantage in determining the "best" location where work (e.g., a job) may be placed. Yet another technical advantage of the present disclosure is the ability to segregate server level rules from service level resource utilization.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following descriptions, taken in conjunction with the accompanying drawings, in which.

DETAILED DESCRIPTION OF EXAMPLE EMBODIMENTS

When a user of a computer system submits a job (e.g., a computing operation) for execution, the computer system may have several parallel computer devices (e.g., servers) available to perform the job. However, not every one of the available computer devices may be appropriate or even suitable for performing the job. For example, some of the available computer devices may not be adequately provisioned to perform the job while others may be too busy to perform the job in spite of being adequately provisioned.

In cases where multiple computer devices are available to perform a job, it may be desirable to consider the appropriateness of each available computer device for performing the job prior to assigning the job so that the best computer device for performing the job may be identified. This process may be especially beneficial in the context of data centers that may have hundreds or even thousands of computer devices from which to choose. To identify the best computer device available for a job, the computer system may monitor the available computer devices on an approximately real-time basis and divert each new job to the most appropriate computer device as each new job comes in. This process of dynamically identifying the best available computer device for performing a job at any given moment may help to balance workload across the computer system, likely increasing reliability and efficiency of the plurality of computer devices.

In particular embodiments, the computer system may use an overall utilization value (e.g., a calculated aggregate of performance metrics that may be based on user-defined parameters), individually collected utilization metrics, events, and user-defined parameters to determine the best computer device available for a particular job. Rule statements (or basic evaluations) may be put together to form complex decision making rules and may be used to evaluate some or all of these criteria, for example, to identify the best computer device available to perform a job, to make decisions about when it is appropriate to take user defined actions, or to provide a new computer device for new work to be performed. The rules may be evaluated on an individual server basis (e.g., for a single computer device) or on a group of computer devices (e.g., a collection of servers). In some cases it may be appropriate to look at the individual computer device as opposed to a group of computer devices because an individual computer device may be critical to a business function and may experience conditions or utilization which indicate that it is over-utilized while the remaining computer devices in the group are not being utilized or are being under utilized. The opposite may be true: the group of computer devices may be heavily utilized or conditions may exist for the service which indicates that the whole group is over-utilized even though the individual computer devices in the group are only moderately utilized.

In some cases, depending on the user-defined parameters and what computer devices are currently available, there may be no appropriate destinations where the work can be placed, and therefore, the computer system may provision a new computer device that will satisfy the user-defined criteria and will be available to perform the new work. For example, if a particular action or job requires a system with a minimum of 2 Giga Bytes ("GB") of RAM and a 2.4 Giga hertz ("GHz") CPU and requires these two metrics to be less than 10% utilized, the computer system may provision a new computer device if none are currently available that fit the given criteria.

The computer system may have the ability to monitor and aggregate resource utilization at an individual computer device level or group level. This, in turn, may enable the computer system to act as an intelligent, real-time resource broker to applications that may require this capability. In particular embodiments, through the use of an aggregated resource utilization value, the computer system may make intelligent decisions based on the user-defined policies, requirements, and real-time analysis of the available computer devices.

Figure 1:
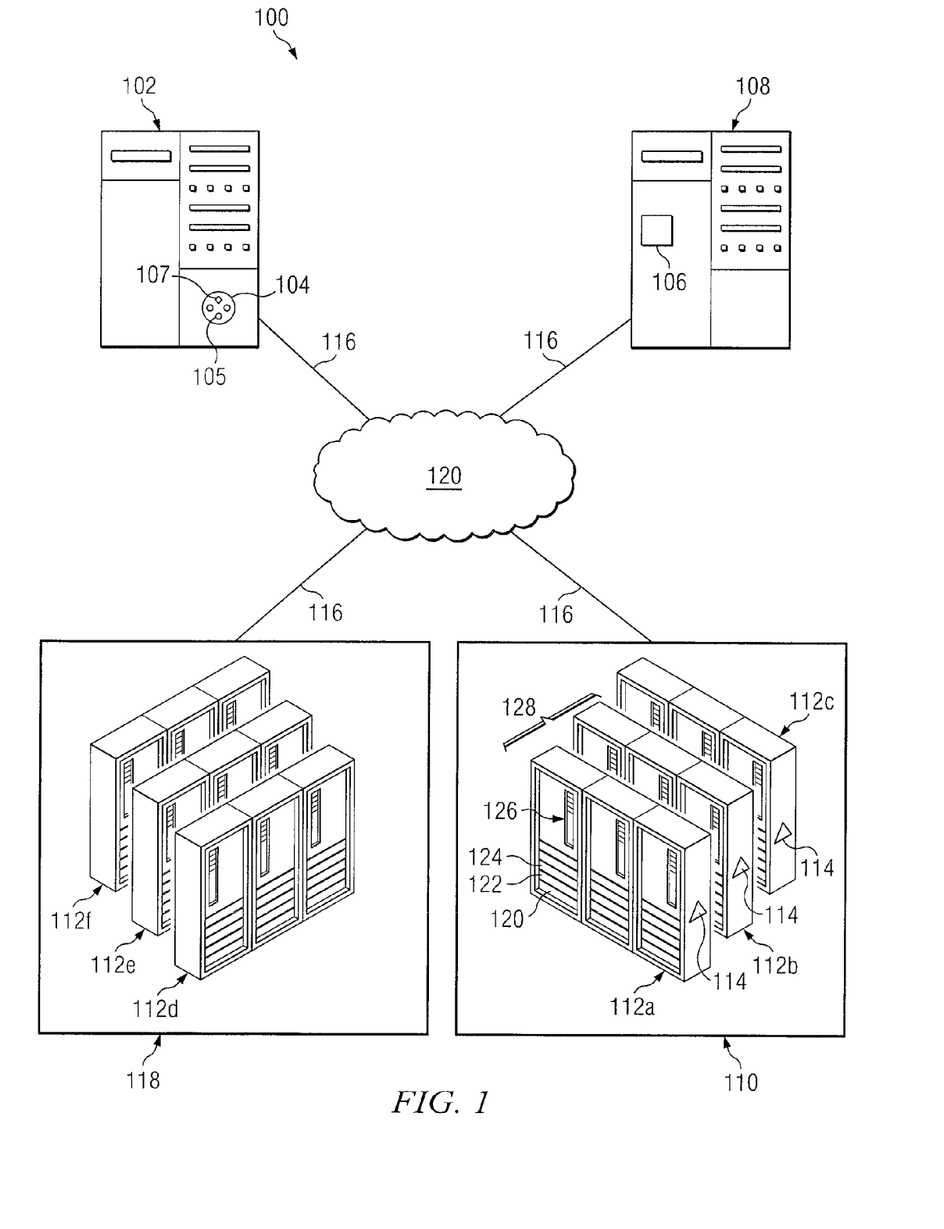
FIG. 1 illustrates an example system for dynamic resource provisioning for job placement according to an example embodiment of the present disclosure.

FIG. 1 illustrates an example system 100 for dynamic resource provisioning for job placement according to an example embodiment of the present disclosure. System 100 generally includes a client machine 102 operable to submit a job request to a brokering engine 106 residing on a server machine 108, the job request including a request to for brokering engine 106 to find a most suitable computer device 112 available for processing a job 104. Brokering engine 106 may monitor an active pool 110 of computer devices 112 and identify the best computer device 112 available in active pool 110 for performing job 104 based on one or more job criteria 105 (e.g., particular hardware requirements) and utilization criteria 107 (e.g., particular utilization requirements) needed to perform job 104. In particular embodiments job criteria 105 and utilization criteria 107 may be submitted to brokering engine 106 as part of the request for a best computer device 112 from client machine 102.

To identify the most suitable computer device 112 for job 104, brokering engine may compare the operational characteristics of each computer device 112 against job criteria 105 to determine a list of computer devices having suitable operational characteristics, and may compare the usage statistics 114 from each computer device 112 on the list against utilization criteria 107 to determine which computer device(s) 112 have a suitable level of activity for performing job 104. Once brokering engine 106 has determined a list of devices 112 having suitable operational characteristics and a suitable level of utilization for performing job 104, brokering engine may return the list of suitable computer devices 112 to client machine 102. and client machine 102 may forward the job to one of the devices on the list for execution. In particular embodiments, if brokering engine 106 determines that none of the computer devices 112 in active pool 110 are appropriate for performing job 104, for example, if none of computer devices 112 are properly provisioned, or if all of computer devices 112 are too busy to perform job 104, brokering engine 106 may provision a new computer device 112 from an inactive pool 118 of computer devices 112 to perform job 104.

The components of system 100 (e.g., client machine 102, server machine 108, and computer devices 112) may be coupled to each other through a network 120 via one or more links 116. In particular embodiments, links 116 may each include one or more wireline, wireless, or optical links. In particular embodiments, one or more links 116 each include a local area network ("LAN"), a wireless local area network ("WLAN"), a wide area network ("WAN"), a metropolitan area network ("MAN"), a portion of the Internet, or another link 116 or a combination of two or more such links 116. Each of the components coupled to network 120 communicate with each other via use of network 120.

In particular embodiments, network 120 may include one or more LANs, WLANs, WANs, MANs, a portion of the Internet, or another form of network or a combination of two or more such networks. The present disclosure contemplates any suitable network 120 or combination of networks 120. In particular embodiments, components of system 100 may be distributed across multiple cities or geographical regions connected by network 120. In particular embodiments, network 120 may be represented by multiple distinct, but interconnected networks that share components or distinctly contain similar components.

Once interconnected, the components of system 100 may work in conjunction with one another to provide computing services to an individual, company, or other organizational entity. One of ordinary skill in the art will appreciate that the above-described architecture of system 100 was presented for the sake of explanatory simplicity and will further appreciate that the components of system 100 may vary in number and arrangement without departing from the scope of the present disclosure.

In a typical scenario, the computer devices 112 in active pool 110 may receive and perform jobs 104 from one or more client machines 102. A job 104 may be any computing-based task submitted by client machine 102 (or other suitable source) to active pool 110 for execution. As an example and not by way of limitation, a job 104 may include an operation or a batch of operations to be performed by a single instance of a computer program residing on one of computer devices 112. For instance, job 104 may be a batch of payroll accounts to be tabulated at the end of a payroll period for employees of a company using the company's payroll program.

Client machine 102 may submit a job 104 to active pool 110 for execution for any number of reasons such as, for example, because client machine 102 lacks the proper software to perform job 104 or because client machine 102 does not have enough processing power to complete the job in a timely manner. In any case, active pool 110 may serve as repository of available computer devices 112 that are currently provisioned and available to perform computing-based operations (e.g., jobs 104) on behalf of client machines 102. For example, active pool 110 may consist of a collection of servers.

In particular embodiments, system 100 may further include an inactive pool 118 of available computer devices 112 that are not currently provisioned to perform computing-based operations on behalf of client machines 102. For example, the computer devices 112 in inactive pool 118 may not be provisioned to perform the job 104 because they are turned off, are offline, or are simply held in reserve unless needed. In any case, the dividing line between the computer devices 112 in active pool 110 and the computer devices 112 in inactive pool 118 may be defined in certain circumstances by whether the computer device 112 is readily able to perform computing-based operations.

In particular embodiments, the distinction between whether a computer device 112 is included in active pool 110 or inactive pool 118 may be indicated by one or more inherent properties of the computer device 112. For example, if a computer device 112 is turned off it may be included in inactive pool 118. As another example and not by way of limitation, if a computer device 112 lacks an operating system it may be included in inactive pool 118. In particular embodiments, a user of system 100 may designate whether a computer device 112 is included in active pool 110 or inactive pool 118 using, for example, an asset profile which includes information regarding computer device 112. One of ordinary skill in the art will appreciate that the above-described criteria for defining active pool 110 and inactive pool 118 were presented for the sake of explanatory simplicity and will further appreciate that the present disclosure contemplates using any suitable method or criteria to define an active pool 110 of computer devices 112 and an inactive pool 118 of computer devices 112.

In particular embodiments, a job 104 may be submitted to active pool 110 from one or more client machines 102. A client machine 102 may be any component of hardware or software or combination of two or more such components operable to submit a job 104 to a computer device 112 for execution. As an example and not by way of limitation, client machine 102 may be considered a special type of computer device 112 distinguished by the fact that it acts as the source of job 104. Typically, client machine 102 resides outside of active pool 110; however, in particular embodiments, client machine 102 may be among the computer devices 112 included in active pool 110.

Client machine 102 may include an interface 120, one or more processors 122, and a memory 124 comprising or capable of receiving logical program instructions recorded on a tangible computer readable media 126 (e.g., a cd-rom, a flash drive, a floppy disk, etc.). In particular embodiments, a user may interact with a client machine 102 either directly or indirectly via any suitable input device(s) (e.g., a keyboard or a mouse) and output device(s) (e.g., a monitor) connected either directly or indirectly to client machine 102. Example embodiments of client machine 102 may include a personal computer, a laptop, a personal digital assistant, or other processor-controlled device capable of submitting a job 104 for execution by a computer device 112.

In particular embodiments, when client machine 102 submits a job 104 to active pool 110 for execution, client machine 102 may be indifferent as to the particular computer device 112 that will ultimately perform job 104. Accordingly, in particular embodiments, client machine 102 may use a brokering engine 106 to select the best (e.g., most suitable) computer device 112 available in active pool 110 for performing job 104. Accordingly, client machine 102 may request brokering engine 106 to find the best computer device 112 available in active pool 110 to perform job 104 and may supply one or more job criteria 105 and one or more utilization criteria 107 to brokering engine 106 to assist brokering engine 106 in identifying the best computer device 112 for performing job 104 as described in more detail below.

Brokering engine 106 may be any component of hardware or software or combination of two or more such components capable of applying the job criteria 105 and utilization criteria 107 associated with job 104 with the computer devices 112 in active pool 110 to determine the best computer device 112 available to perform job 104. As an example and not by way of limitation, brokering engine 106 may be a software program that logically resides between client machine 102 and active pool 110. As an additional example and not by way of limitation, brokering engine 106 may be a software program that resides on client machine 102 or on a computer device 112 in active pool 110. In any case, when brokering engine 106 receives a request to find the best computer device 112 to perform job 104 from client machine 102, brokering engine 106 may identify the best computer device 112 available to perform job 104 to client machine 102 and client machine 102 may forward job 104 to the best computer device 112 for execution based on the decision of brokering engine 106.

A computer device 112 may be any processor-controlled device or combination of two or more such devices capable of executing a computing operation (e.g., a job 104). As an example and not by way of limitation, a computer device 112 may be a host computer, workstation, personal computer, web server, file server, or other server. In particular embodiments, a computer device 112 may include an interface 120, one or more processors 122, and a memory 124 comprising or capable of receiving logical program instructions recorded on a tangible computer readable media 126 (e.g., a cd-rom, a flash drive, a floppy disk, etc.). In particular embodiments, a user may interact with a computer device 112 either directly or indirectly via any suitable input device(s) (e.g., a keyboard or a mouse) and output device(s) (e.g., a monitor) connected either directly or indirectly to computer device 112.

Processor 122 may refer to any suitable device operable to execute instructions and manipulate data to perform operations for computer devices 112. Processor 122 may include, for example, any type of central processing unit (CPU). Memory 124 may be any form of volatile or non-volatile memory including, without limitation, magnetic media, optical media, random access memory (RAM), read-only memory (ROM), removable media, or any other suitable local or remote memory component. Interface 120 may comprise any hardware, software, or encoded logic operable to send and receive information to and from other components of system 100 such as client machine 102, server machine 108, or other computer devices 112.

In particular embodiments, a computer device 112 may include any number and type of software applications such as one or more operating systems (e.g., MS-DOS, PC-DOS, MAC-OS, WINDOWS, UNIX, or other suitable operating system), database applications (e.g. MICROSOFT EXCEL, MICROSOFT ACCESS), word processing applications (e.g., MICROSOFT WORD), proprietary applications, or other suitable software applications, one or more of which may be suitable for performing job 104.

When a computer device 112 performs a computer-based operation (e.g., a job 104), various resources of the computer device 112 (e.g., processor capacity, memory capacity, etc.) may be devoted to performing that computer-based operation. Thus, the amount of resources that a computer device 112 has available at a given moment in time may limit the number of jobs 104 that the computer device 112 may perform without reaching its operational capacity (e.g., the point at which the computer device 112 has no further resources available). Moreover, as the usage of a computer device 112 reaches its operational capacity, the performance of computer device 112 may decline. For example, computer device 112 may run slower as the usage of the computer device 112 nears its operational capacity. Furthermore, computer device 112 may crash or exhibit other problems if the usage of computer device 112 exceeds its operational capacity.

The usage of computer device 112 (e.g., the activity level of computer device 112) may be monitored, for example, using one or more utilization metrics 114 gathered from computer device 112. For example, the utilization metrics 114 may be regularly gathered by a collection agent residing on each computer device 112 and delivered to brokering engine 106 at regular intervals (e.g., every 30 seconds). Utilization metrics 114 may include any indicator(s) suitable for indicating the amount of resources that a computer device 112 has available to perform a job 104. For example, a utilization metric 114 may be a single numeric value that represents a particular type and level of resource usage currently taking place at computer device 112. Though utilization metrics 114 may vary depending upon the characteristics of the computer device 112 being monitored, example utilization metrics 114 may include system level metrics (e.g., clustered environment and virtualized environment) as well as applications level metrics. For example, utilization metrics 114 may include memory utilization metrics, such as paging metrics, swapping metrics, and available memory metrics. As another example, utilization metrics 114 may include CPU utilization metrics at the particular computer device 112. For the sake of explanatory clarity, a nonlimiting list of example utilization metrics 114 that may be used to monitor the activity level of a computer device 112 follows at the end of the specification.

In particular embodiments, one or more utilization metrics 114 may be combined into a single overall utilization metric that may generally describe the current activity level of a computer device 112. Moreover, the overall utilization metric (or any other utilization metric 114) for a computer device 112 may be a normalized value relative to other computer devices 112 to enable system 100 to easily compare the usage level of one computer device 112 against the usage level of another computer device 112. A system and method for creating an overall utilization metric for a computer device 112 is described in co-pending and commonly assigned U.S. patent application Ser. No. 12/123,885 entitled, "System and Method for Determining Overall Utilization." One of ordinary skill in the art will appreciate that the present disclosure contemplates the use of any suitable utilization metric 114 or combination of utilization metrics 114 to describe the current activity level of a computer device 112.

To determine the best computer device 112 available to perform job 104, brokering engine 106, upon receiving a request for a best computer device 112 from client machine 102 to perform job 104 (e.g., as part of a request to place job 104), may receive one or more job criteria 105 associated with job 104 that may define a set of operational characteristics needed for a computer device 112 to be suitable for executing job 104. Brokering engine 106 may further receive one or more utilization criteria 107 associated with job 104 that may define an amount of resource availability (e.g., a level of utilization) needed for a computer device 112 to be suitable for executing job 104. Using job criteria 105 to weed out computer devices 112 that do not have suitable operational characteristics, brokering engine 106 may compile a list of suitable computer devices 112 within active pool 110 to perform job 104. In particular embodiments, the list of suitable computer devices 112 may include only those computer devices 112 within active pool 110 having operational characteristics that satisfy job criteria 105.

Once brokering engine 106 has compiled the list of suitable computer devices 112, brokering engine may compare usage statistics 114 (e.g., an overall utilization value derived from usage statistics 114) for each computer device 112 on the list with utilization criteria 107 to identify which computer device(s) 112 on the list have a suitable level of utilization for performing job 104. As brokering engine 106 compares the utilization level of each computer device 112 on the list against utilization criteria 107, brokering engine 106 may remove from the list computer devices 112 having a utilization level that does not satisfy utilization criteria 107. Once brokering engine 106 has identified the computer device(s) 112 on the list having a suitable level of utilization for performing job 104, brokering engine 106 may provide the list of suitable computer devices 112 to client machine 102 as the list may be considered to include the best computer device(s) 112 for performing job 104. Client machine 102 may then select a computer device 112 from the list and forward job 104 to that computer device 112 for execution.

In particular embodiments, the list of computer device(s) 112 provided to client machine 102 may only include a single computer device 112, such as for example, if utilization criteria 107 specifies that brokering engine 106 should identify the least utilized computer device 112 on the list of suitable computer devices 112. In particular embodiments, the list of computer device(s) 112 provided to client machine 102 may include multiple computer device 112 such as for example, if utilization criteria 107 specifies that brokering engine 106 should identify all computer devices 112 operating within a certain level of utilization. If the list of suitable computer devices 112 returned to client machine 102 contains multiple computer devices 112, client machine 102 may select one of the computer devices 112 from the list using any suitable means of selection. For example, the list of suitable computer devices 112 may be presented to a user who may select a computer device 112 to execute job 104, or client machine 102 may automatically select one of the computer devices 112 on the list to execute job 104.

A job criteria 105 may specify any desired operational characteristic of a computer device 112 needed for computer device 112 to satisfactorily perform job 104. As an example and not by way of limitation, job criteria 105 may include, a desired type or version of software such as an operating system, a desired type of processor, a desired processor speed, a desired amount of RAM, a desired amount of hard drive space, an number of computer devices 112 needed to perform the job, a total amount of physical memory, a total amount of SWAP, an amount of available physical memory, and amount of available SWAP, a minimum amount of time over which computer device 112 must keep a certain amount and type of system resources (e.g., CPU utilization) available to perform job 104, or any other desired operating characteristic. In particular embodiments, one or more job criteria 105 may be predicated on required operational characteristics without which a computer device 112 cannot perform job 104. In particular embodiments, one or more job criteria 105 may be predicated on preferred operational characteristics that are not necessary to perform job 104, but which are preferred for one reason or another. In any case, brokering engine 106 may use job criteria 105 to disqualify unsuitable computer devices 112 from performing job 104, thereby eliminating the need, for example, for brokering engine 106 to determine the utilization level of the unsuitable computer devices 112.

Utilization criteria 107 may be any criteria or combination of criteria that specify a desired level of utilization needed for a computer device 112 to satisfactorily perform job 104. As an example and not by way of limitation, utilization criteria 107 may specify that the least utilized computer device 112 on the list of suitable computer devices should be selected to perform job 104. As an additional example and not by way of limitation, utilization criteria 107 may specify a maximum acceptable level of utilization that represents a threshold level of resource usage, above which brokering engine 106 will determine that a computer device 112 is too busy to perform job 104. However, if the resource usage of a computer device 112 falls below the maximum acceptable utilization level, brokering engine 106 may determine that that computer device 112 has a suitable level of utilization for performing job 104. As an example and not by way of limitation, if the level of utilization for each computer device 112 is expressed as an overall utilization value, the utilization criteria 107 may be a single numeric value against which brokering engine 106 may compare the overall utilization value for a particular computer device 112 to determine whether that computer device 112 is too busy to perform job 104. Depending upon the design of brokering engine 106, two of more utilization criteria 107 may be flexibly combined with one another. For example a first utilization criteria 107 may specify that the least utilized computer device 112 should be selected to perform job 104 while a second utilization criteria identifies a maximum acceptable level of utilization above which brokering engine 106 will determine that a resource 112 is unsuitable to perform job 104 even if that resource 112 is the least active resource 112 available. In any case, brokering engine 106 may use utilization criteria 107 to identify one or more computer devices 112 having a suitable level of utilization for performing job 104.

Depending upon the design of system 100, the job criteria 105 and utilization criteria 107 associated with a job 104 may be specified by a user, derived by brokering engine 106 from the characteristics of job 104, or both. As an example and not by way of limitation, when a user submits a job 104 using client machine 102, the user may specify that the job 104 requires a certain type of processor and a certain amount of free memory and that the user would like the least utilized computer device 112 available to perform the job. As an additional example and not by way of limitation, when brokering engine 106 receives the request to determine the best computer device 112 to perform job 104, brokering engine 106 may determine that job 104 requires a particular program for execution. Accordingly, brokering engine 106 may combine the job criteria 105 that it received from the user with the job criteria 105 that it derived from the characteristics of job 104 to create a complete list of job criteria 105 for narrowing the field of available computer devices 112 in active pool 110 to include only the computer devices 112 whose operational characteristics satisfy job criteria 105. In particular embodiments job criteria 105 may be expressed, for example, in Job Description Language ("JDL").

Once brokering engine 106 has compiled a list of suitable computer devices 112 whose operational characteristics satisfy job criteria 105, brokering engine 106 may compare the utilization statistics 114 for each computer device 112 on the list against utilization criteria 107 to identify the computer device(s) 112 on the list having a suitable level of activity for performing job 104. Depending upon the design of system 100, the utilization metrics 114 chosen to gauge the activity level of each computer device 112 may be specified by a user, specified by brokering engine 106, or both. As an example and not by way of limitation, when a user submits a job 104 to brokering engine 106, the user may specify that memory usage should be used as the relevant utilization metric 114 to gauge the utilization level of each computer device 112. Depending upon the design of system 100, the user may further specify a mathematical formula for determining a customized aggregated value from a plurality of user-specified utilization metrics 114. In such a case, brokering engine 106 may compare the customized aggregated value for each computer device 112 against utilization criteria 107 to identify the computer device(s) 112 having a suitable level of utilization for performing job 104. Typically, the utilization metrics 114 chosen to gauge the activity level of each computer device 112 should be common across all computer devices 112 to ensure a proper basis of comparison.

In particular embodiments, brokering engine 106 may use one or more default utilizations metrics 114 (e.g., CPU usage, Memory usage, or an overall utilization metric) to gauge the activity level of each computer device 112. Furthermore, brokering engine 106 may supply a default formula for determining an aggregated value from the default utilization metrics 114. As an example and not by way of limitation, brokering engine 106 may identify the least utilized computer device 112 as the computer device 112 with the least percentage of CPU use. If computer device 112 is a multiprocessor computer device 112, the percentage of CPU usage may be derived using the following formula: (total percentage of CPU use)=(Sum of Percentage of CPU use for each CPU)/(number of CPUs). As an additional example and not by way of limitation, brokering engine 106 may determine a percentage of memory (e.g., SWAP memory or physical memory) for a resource using the following formula: (Percentage of Used Memory)=(Memory Used)/(Total Memory Available). One of ordinary skill in the art will appreciate that the above-described formulas and utilization metrics 114 were presented for the sake of explanatory simplicity and will further appreciate that the present disclosure contemplates the use of any suitable number and type of utilization metrics 114 in any suitable formula to determine a numeric measure of utilization for a computer device 112.

Depending upon the design of system 100, brokering engine 106 may receive utilization metrics 114 from all of the computer devices 112 in active pool 110 at regular intervals (e.g., on a regular polling cycle) so that brokering engine 106 has such information immediately available at the time a job 104 is submitted. Alternatively, brokering engine 106 may gather utilization metrics 114 from computer devices 112 after job 104 has been submitted. Brokering agent 106 may receive utilization metrics 114, for example, from a collection agent residing on each computer device 112, though one of skill in the art will appreciate that any suitable means of collection may be used. In any case, brokering engine 106 may use utilization metrics 114 to identify the computer device(s) 112 having a suitable level of utilization for performing job 104 at the approximate moment in time that job 104 is submitted.

In certain situations, it may be the case that no computer device 112 is available in active pool 110 to perform job 104, for example, because none of the computer devices 112 in active pool 110 satisfy job criteria 105, or because all of the computer devices 112 that do satisfy job criteria 105 are too busy to perform job 104 (e.g., if the utilization level for every computer device 112 exceeds the maximum acceptable level of utilization specified by a user as part of utilization criteria 107). In such a case, brokering engine 106 may, for example, postpone performance of job 104 until an appropriate computer device 112 becomes available, or brokering engine 106 may request to provision new computer devices 112 from inactive pool 118 to perform job 104.

When brokering engine 106 provisions a new computer device 112 from inactive pool 118, brokering engine may take whatever steps are necessary to make the new computer device 112 ready to execute job 104. For example, brokering engine may request to turn the new resource on, supply necessary software to the new computer device 112, or perform any other suitable steps needed to enable the new computer device 112 to perform job 104. Once the new resource has been set up to perform job 104, brokering engine 106 may forward job 104 to the new computer device 112 for execution.

In particular embodiments, brokering engine 106 may monitor a group of computer devices 112 as a single entity referred to as a service 128. As an example and not by way of limitation, active pool 110 may include multiple services 128, each including a separate group of computer devices 112. Like computer devices 112, services 128 may be monitored by brokering engine 106 using utilization metrics 114. For example, brokering engine 106 may aggregate the utilization metrics 114 for each computer device 112 included in a particular service 128 into a single value that represents the overall usage of the particular service 128. Brokering engine 106 may then use the aggregated value for each service 128 to determine the least active service 128 in active pool 110.

In particular embodiments, job criteria 105 and utilization criteria 107 may be tailored to services 128 and brokering engine 106 may use the process described above to determine the best service 128 available in active pool 110 to perform a job 104 submitted by client machine 102 or may determine that a new service 128 should be provisioned if no suitable service 128 is available.

Figure 2:
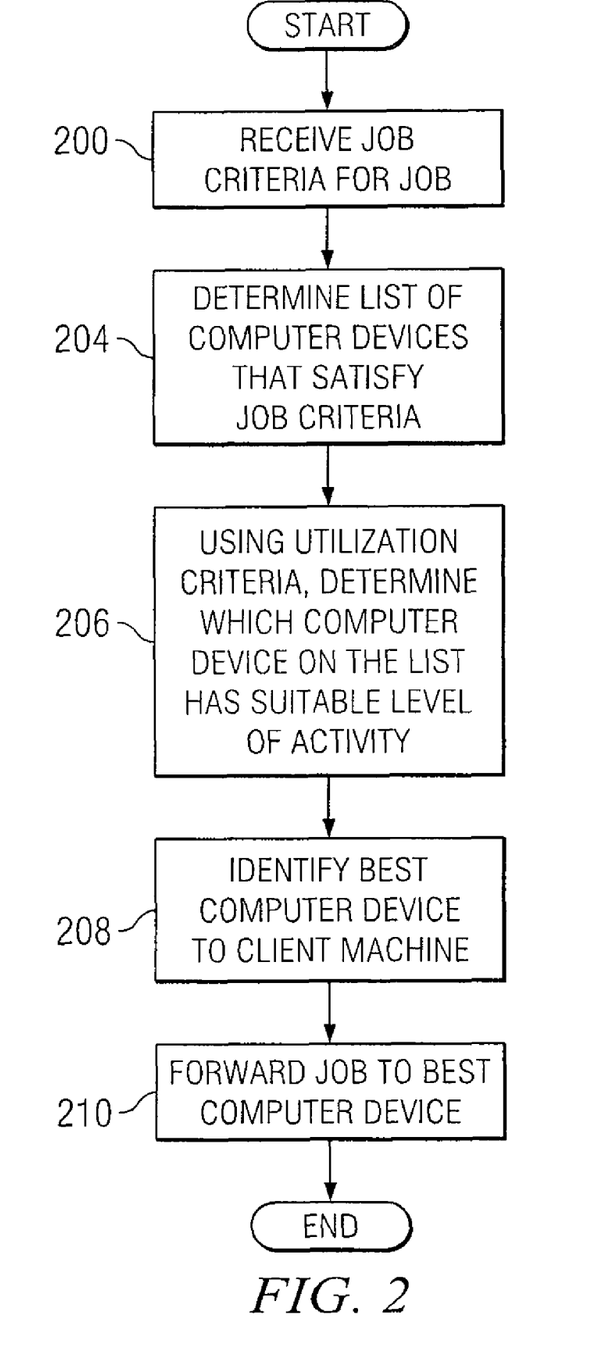
FIG. 2 illustrates an example method for dynamic resource provisioning for job placement according to an example embodiment of the present disclosure.

FIG. 2 illustrates an example method for dynamic resource provisioning for job placement according to an example embodiment of the present disclosure. The method begins at step 200 where brokering agent 106 receives a request to find a best computer device 112 on which to run a job 104 from client machine 102 including job criteria 105 and utilization criteria 107. The method continues at step 204 where brokering engine 106 determines a list of suitable computer devices 112 for performing job 104 by comparing the operational characteristics of each of the computer devices 112 in pool 110 against job criteria 105 and disqualifying any computer devices whose operational characteristics do not satisfy job criteria 105. The method continues at step 206 where brokering engine 106 compares the utilization metrics 114 gathered from each of the computer devices 112 on the list of suitable computer devices 112 against utilization criteria 107 to identify computer device(s) 112 having a suitable level of utilization for performing job 104. At step 208, the list of computer devices 112 having suitable operational characteristics and a suitable level of utilization for performing job 104 is returned to client machine 102 by brokering engine 106. The method continues at step 210 where client machine 102 forwards job 104 to one of the computer devices 112 on the list of suitable computer devices 112 for execution, after which the method ends.

As mentioned above with respect to FIG. 1, example utilization metrics 114 may include metrics such as those listed in TABLE 1 below.

TABLE 1

| Platform | Metric | Description |
|---|---|---|
| Windows | Physical disk: Disk Read Bytes per second | The rate which data is read from the physical disk. |
| Windows | Physical disk: Disk Write Bytes per second | The rate which data is written to the physical disk. |
| Windows | Physical disk: Percentage Disk Time | The percentage of elapsed time that the disk drive is busy servicing read or write requests. |
| Windows | Percentage Processor Time | The percentage of elapsed time that the processor spends running a non-idle thread. |

TABLE 1-continued

| Platform | Metric | Description |
|---|---|---|
| Windows | Memory: Available MB | The amount of physical memory in megabytes available to processes running on the computer. |
| Windows | Memory: Pages per Second | The rate at which pages are read from or written to the disk to resolve hard page faults. |
| Windows | Memory: Percentage Committed Bytes in Use | The percentage of total possible physical memory in use for which space has been reserved in the paging file if it needs to be written to the disk. |
| Windows | Network Interface: Bytes Total per Second | The rate at which bytes are sent and received over each network adapter including message framing characters. |
| Windows | Network Interface: Current Bandwidth | The estimated current bandwidth of the network interface in bits per second. For example, 10000 represents 10 Mbps. |
| Windows | Network Interface: Packets per Second | The rate at which packets are sent and received on the network interface. |
| Windows Microsoft Cluster Server "MSCS" Cluster | Uptime Percentage | The percentage of time a cluster has been evaluated as being in an "Up" state. |
| Windows MSCS Node | Uptime Percentage | The percentage of time a cluster node has been evaluated as being in an in an "Up" state. |
| Windows MSCS Resource Group | Uptime Percentage | The percentage of time a cluster resource group has been evaluated as being in an in an "Up" state. |
| Windows MSCS Resource | Uptime Percentage | The percentage of time a cluster resource has been evaluated as being in an in an "Up" state. |
| Windows MSCS Network Interface | Uptime Percentage | The percentage of time a cluster network interface has been evaluated as being in an in an "Up" state. |
| Windows MSCS Network | Uptime Percentage | The percentage of time a cluster network has been evaluated as being in an in an "Up" state. |
| Windows Veritas Cluster | Uptime Percentage | The percentage of time a cluster has been evaluated as being in an in an "Up" state. |
| Windows Veritas Cluster Node | Uptime Percentage | The percentage of time a cluster node has been evaluated as being in an in an "Up" state. |
| Windows Veritas Cluster Service Group | Uptime Percentage | The percentage of time a cluster service group has been evaluated as being in an in an "Up" state. |
| Windows Veritas Cluster Resource | Uptime Percentage | The percentage of time a cluster resource has been evaluated as being in an in an "Up" state. |
| Linux | CPU Group: Total Usage Percentage User | The percentage of elapsed time that the process spends to run user instructions. |
| Linux | CPU Group: Total Usage Percentage System | The percentage of elapsed time that the processor spends to run operating system instructions. |
| Linux | CPU Group: Load Average Fifteen | The fifteen minute load average. |
| Linux | Disk Group: Bytes per Second | The rate which data is read from and written to the physical disk. |
| Linux | Disk Group: Reads per Second | The rate which data is read from the physical disk. |
| Linux | Disk Group: Writes per Second | The rate which data is written to the physical disk. |
| Linux | Network Group: TCP Operations Packets Received per Second | The rate at which the network interface is receiving packets. |
| Linux | Network Group: TCP Operations Packets Sent per | The rate at which the network interface is sending packets. |

TABLE 1-continued

| Platform | Metric | Description |
|---|---|---|
| Linux | Second File System Group: Free Space | Available storage space in the file system in kilobytes. |
| Linux | File System Group: Used Space | Used storage space in the file system in kilobytes. |
| Sun Solaris Veritas Cluster | Uptime Percentage | The percentage of time a cluster has been evaluated as being in an in an "Up" state. |
| Sun Solaris Veritas Cluster Node | Uptime Percentage | The percentage of time a cluster node has been evaluated as being in an in an "Up" state. |
| Sun Solaris Veritas Cluster Service Group | Uptime Percentage | The percentage of time a cluster service group has been evaluated as being in an in an "Up" state. |
| Sun Solaris Veritas Cluster Resource | Uptime Percentage | The percentage of time a cluster resource has been evaluated as being in an in an "Up" state. |
| Solaris | CPU Group: Total Usage Percentage User | The percentage of elapsed time that the process spends to run user instructions. |
| Solaris | CPU Group: Total Usage Percentage System | the percentage of elapsed time that the processor spends to run operating system instructions. |
| Solaris | CPU Group: Load Average Fifteen | The fifteen minute load average. |
| Solaris | Disk Group: Bytes per Second | The rate which data is read from and written to the physical disk. |
| Solaris | Disk Group: Reads per Second | The rate which data is read from the physical disk. |
| Solaris | Disk Group: Writes per Second | The rate which data is written to the physical disk. |
| Solaris | Network Group: TCP Operations Packets Received per Second | The rate at which the network interface is receiving packets. |
| Solaris | Network Group: TCP Operations Packets Sent per Second | The rate at which the network interface is sending packets. |
| Solaris | File System Group: Free Space | Available storage space in the file system in kilobytes. |
| Solaris | File System Group: Used Space | Used storage space in the file system in kilobytes. |
| VMware ESX Server | VMware ESX 3.0 Server Disk: KB Read per Second | The number of kilobytes read from the disk per second. |
| VMware ESX Server | VMware ESX 3.0 Server Disk: KB Written per Second | The number of kilobytes written to the disk per second. |
| VMware ESX Server | VMware ESX 3.0 VM CPU: CPU Usage (percentage) | The percentage of elapsed time that the processor uses to run the virtual machine. |
| VMware ESX Server | VMware ESX 3.0 VM Memory: Memory Usage (percentage) | The percentage of the total amount of physical memory used by the virtual machine. |
| VMware ESX Server | VMware ESX 3.0 VM Memory: Available Memory (KB) | The amount of memory available for use by the virtual machine in kilobytes. |
| VMware ESX Server | VMware ESX 3.0 VM Disk: KB Read per Second | The number of kilobytes read from the virtual machine disk per second. |
| VMware ESX Server | VMware ESX 3.0 VM Disk: KB Written per Second | The number of kilobytes written to the virtual machine disk per second. |
| VMware ESX Server | VMware ESX 3.0 VM Network: KB Transmitted per Second | The number of kilobytes transmitted (total amount of data sent and received) by the virtual machine over the network per second. |
| VMware ESX Server | VMware ESX 3.0 VM Network: KB Received per Second | The number of kilobytes received by the virtual machine over the network per second. |
| IBM AIX | Memory Group: Percentage Free Physical Memory | The percentage of physical memory free on the system. |
| IBM AIX | CPU: Percentage Total | The total percentage of CPU utilization on the system. |
| IBM AIX | CPU Group: Total Usage Percentage User | Total CPU utilization due to user activity on the system. |
| IBM AIX | CPU Group: Total Usage Percentage System | Total CPU utilization due to OS activity on the system. |
| IBM AIX | CPU Group: Load Averages Fifteen | The fifteen minute load-average of the system. |
| IBM AIX | Disk Group: Bytes per Second | The number of bytes read and written per second by the disk. |
| IBM AIX | Disk Group: Reads per Second (average) | The average number of reads per second by the disk. |
| IBM AIX | Disk Group: Writes per Second (average) | The average number of writes per second by the disk. |
| IBM AIX | Network Group: TCP Operations Packets Received per Second | The number of packets received per second by the network adapter. |
| IBM AIX | Network Group: TCP Operations Packets Sent per Second | The number of packets sent per second by the network adapter. |
| IBM AIX | File System Group: Free Space | Amount of free space (in bytes) of the file system. |
| IBM AIX | File System Group: Used Space | Amount of used space (in bytes) of the file system. |
| IBM AIX | CPU Group: Total Usage Percentage Idle | The percentage of CPU used by the system idle process. |
| HP UNIX | Memory Group: Percentage Free Physical Memory | The percentage of physical memory free on the system. |
| HP UNIX | CPU: Percentage Total | The total percentage of CPU utilization on the system. |
| HP UNIX | CPU Group: Total Usage Percentage User | Total CPU utilization due to user activity on the system. |
| HP UNIX | CPU Group: Total Usage Percentage System | Total CPU utilization due to OS activity on the system. |
| HP UNIX | CPU Group: Load Averages Fifteen | The fifteen minute load-average of the system. |
| HP UNIX | CA Disk Group: Bytes per Second | The number of bytes read and written per second by the disk. |
| HP UNIX | Disk Group: Reads per Second (average) | The average number of reads per second by the disk. |
| HP UNIX | Disk Group: Writes per Second (average) | The average number of writes per second by the disk. |
| HP UNIX | Network Group: TCP Operations Packets Received per Second | The number of packets received per second by the network adapter. |
| HP UNIX | Network Group: TCP Operations Packets Sent per Second | The number of packets sent per second by the network adapter. |
| HP UNIX | File System Group: Free Space | Amount of free space (in bytes) of the file system. |
| HP UNIX | File System Group: Used Space | Amount of used space (in bytes) of the file system. |
| HP UNIX | CPU Group: Total Usage Percentage Idle | The percentage of CPU used by the system idle process. |
| Windows | Agent Stats: Metric Count | Total number of metrics of an Introscope agent collects |
| Windows | Backends: Average Response Time (ms) | Average milliseconds taken for a backend component to respond to a request |
| Windows | Backends: Errors Per Interval | Number of backend errors per poll interval |
| Windows | Backends: Stall Count | Number of times the backend invocation has been stalled |
| Windows | Frontends: Average Response Time (ms) | Average number of milliseconds taken for a frontend component to respond to a request |
| Windows | Frontends: Errors Per Interval | Number of frontend errors per poll interval |
| Windows | Frontends: Stall Count | Number of times the frontend invocation has been stalled |
| Windows | Frontends: Connection Count | Number of open connections to a frontend component |
| Windows | CPU: Utilization % | Aggregate % CPU utilization |

TABLE 1-continued

| Platform | Metric | Description |
|---|---|---|
| | (aggregate) | |
| Windows | CPU: Utilization % (process) | Application's % CPU utilization |
| Windows | GC Heap: Bytes Total | Total JVM heap size in bytes |
| Windows | GC Heap: Bytes In Use | Bytes in use by JVM |
| Windows | EJB: Average Response Time (ms) | Average number of milliseconds taken for an EJB component to respond to a request |
| Windows | EJB: Errors Per Interval | Number of EJB errors per poll interval |
| Windows | EJB: Stall Count | Number of times the EJB invocation has been stalled |
| Windows | JSP: Average Response Time (ms) | Average number of milliseconds taken for an JSP component to respond to a request |
| Windows | JSP: Responses Per Interval | Number of responses per poll interval for a JSP component |
| Windows | JSP: Errors Per Interval | Number of JSP errors per poll interval |
| Windows | JSP: Stall Count | Number of times the JSP invocation has been stalled |
| Windows | Servlets: Average Response Time (ms) | Average number of milliseconds taken for an Servlet to respond to a request |
| Windows | Servlets: Responses Per Interval | Number of responses per poll interval for a Servlet component |
| Windows | Servlets: Errors Per Interval | Number of Servlet errors per poll interval |
| Windows | Servlets: Stall Count | Number of times the Servlet invocation has been stalled |
| Windows | Sockets: Opens Per Interval | Number of sockets opened per poll interval |
| Windows | Sockets: Closes Per Interval | Number of sockets closed per poll interval |
| Windows | Sockets: Accepts Per Interval | Number of socket accepts per poll interval |

Although the present disclosure has been described in several embodiments, a myriad of changes, substitutions, and modifications may be suggested to one skilled in the art, and it is intended that the present disclosure encompass such changes, substitutions, and modifications as fall within the scope of the present appended claims.

What is claimed is:

1. A method for dynamic resource provisioning for job placement, comprising:
   receiving a request to perform a job on an unspecified computer device;
   determining one or more job criteria for performing the job, the one or more job criteria defining one or more operational characteristics needed for a computer device to perform the job;
   determining one or more utilization criteria for performing the job;
   providing a list of available computer devices, the list comprising a plurality of computer devices currently provisioned to perform computer operations;
   from the list of available computer devices, determining a list of suitable computer devices for performing the job by comparing operational characteristics for each available computer device with the job criteria, the list of suitable computer devices comprising one or more computer devices having operational characteristics that satisfy the job criteria;
   using the utilization criteria to determine whether one or more underutilized computer devices exist on the list of suitable computer devices, the one or more underutilized computer devices having a suitable level of utilization for performing the job; and
   if the one or more underutilized computer devices exist, forwarding the job to one of the one or more underutilized computer devices.

2. The method of claim 1, further comprising provisioning a new computer device to perform the job from a plurality of inactive computer devices if there are no underutilized computer devices on the list of suitable computer devices.

3. The method of claim 2, further comprising enabling a user to specify the inactive computer devices included in the plurality of inactive computer devices.

4. The method of claim 1, wherein using the utilization criteria to identify one or more underutilized computer devices comprises, for each computer device on the list of suitable computer devices:
   determining a utilization value;
   comparing the utilization value with the utilization criteria; and
   removing the each device from the list of suitable computer devices if the utilization value does not satisfy the utilization criteria.

5. The method of claim 4, wherein:
   the utilization criteria comprises a maximum acceptable utilization value; and
   removing the each device from the list of suitable devices comprises removing the each device from the list of suitable computer devices if the utilization value for the each device exceeds the maximum acceptable utilization value.

6. The method of claim 4, wherein the utilization value comprises an aggregated value derived from a plurality of utilization metrics for the each device.

7. The method of claim 6, wherein determining a utilization value for the each computer device on the list of suitable computer devices comprises enabling a user to:
   specify the plurality of utilization metrics; and
   provide a customized formula for determining the aggregated value from the plurality of utilization metrics.

8. The method of claim 1, wherein:
   using the utilization criteria to determine whether one or more underutilized computer devices exist on the list of suitable computer devices comprises identifying a computer device having a lowest level of activity relative to other computer devices on the list of suitable computer devices; and
   forwarding the job to one of the one or more underutilized computer devices comprises forwarding the job to the computer device having the lowest level of utilization.

9. The method of claim 1, wherein:
   determining one or more job criteria for performing the job comprises enabling a user to specify the one or more job criteria; and
   determining one or more utilization criteria for performing the job comprises enabling a user to specify the one or more utilization criteria.

10. The method of claim 1, wherein each computer device comprises a group of servers.

11. A system for dynamic resource provisioning for job placement, comprising:
   an interface operable to receive a request to perform a job on an unspecified computer device from a client machine;
   one or more processors operable to:
      determine one or more job criteria for performing the job, the one or more job criteria defining one or more operational characteristics needed for a computer device to perform the job;

determine one or more utilization criteria for performing the job;

provide a list of available computer devices, the list comprising a plurality of computer devices currently provisioned to perform computer operations;

from the list of available computer devices, determine a list of suitable computer devices for performing the job by comparing operational characteristics for each available computer device with the job criteria, the list of suitable computer devices comprising one or more computer devices having operational characteristics that satisfy the job criteria;

use the utilization criteria to determine whether one or more underutilized computer devices exist on the list of suitable computer devices, the one or more underutilized computer devices having a suitable level of utilization for performing the job; and if the one or more underutilized computer devices exist, identify the one or more underutilized computer devices to the client machine.

12. The system of claim 11, wherein the one or more processors are operable to use the utilization criteria to identify one or more underutilized computer devices by, for each computer device on the list of suitable computer devices:

determining a utilization value;

comparing the utilization value with the utilization criteria; and removing the each device from the list of suitable computer devices if the utilization value does not satisfy the utilization criteria.

13. The system of claim 12, wherein:

the utilization criteria comprises a maximum acceptable utilization value; and the one or more processors are operable to remove the each device from the list of suitable devices by removing the each device from the list of suitable computer devices if the utilization value for the each device exceeds the maximum acceptable utilization value.

14. The method of claim 11, wherein the one or more processors are operable to determine the one or more job criteria for performing the job by enabling a user to specify the one or more job criteria.

15. The method of claim 11, wherein the one or more processors are configured to:

use the utilization criteria to determine whether one or more underutilized computer devices exist on the list of suitable computer devices by identifying a computer device having a lowest level of activity relative to other computer devices on the list of suitable computer devices; and identify the computer device having a lowest level of activity to the client machine.

16. A non-transitory computer-readable medium comprising logic which, when executed by a processor, causes the processor to perform steps comprising:

receiving a request to perform a job on an unspecified computer device from a client machine;

determining one or more job criteria for performing the job, the one or more job criteria defining one or more operational characteristics needed for a computer device to perform the job;

determining one or more utilization criteria for performing the job;

providing a list of available computer devices, the list comprising a plurality of computer devices currently provisioned to perform computer operations;

from the list of available computer devices, determining a list of suitable computer devices for performing the job by comparing operational characteristics for each available computer device with the job criteria, the list of suitable computer devices comprising one or more computer devices having operational characteristics that satisfy the job criteria;

using the utilization criteria to determine whether one or more underutilized computer devices exist on the list of suitable computer devices, the one or more underutilized computer devices having a suitable level of utilization for performing the job; and if the one or more underutilized computer devices exist, identify the one or more underutilized computer devices to the client machine.

17. The computer-readable medium of claim 16, wherein using the utilization criteria to identify one or more underutilized computer devices comprises, for each computer device on the list of suitable computer devices:

determining a utilization value;

comparing the utilization value with the utilization criteria; and removing the each device from the list of suitable computer devices if the utilization value does not satisfy the utilization criteria.

18. The computer-readable medium of claim 17, wherein:

the utilization criteria comprises a maximum acceptable utilization value; and removing the each device from the list of suitable devices comprises removing the each device from the list of suitable computer devices if the utilization value for the each device exceeds the maximum acceptable utilization value.

19. The computer-readable medium of claim 16, determining one or more job criteria for performing the job comprises enabling a user to specify the one or more job criteria.

20. The computer-readable medium of claim 16, wherein:

using the utilization criteria to determine whether one or more underutilized computer devices exist on the list of suitable computer devices comprises identifying a computer device having a lowest level of activity relative to other computer devices on the list of suitable computer devices; and wherein the computer is further operable when executing the logic to perform steps comprising:

identifying the computer device having a lowest level of activity to the client machine.

* * * * *